United States Patent [19]

Klausing et al.

[11] Patent Number: 5,017,922
[45] Date of Patent: May 21, 1991

[54] RADAR SYSTEM HAVING A SYNTHETIC APERTURE ON THE BASIS OF ROTATING ANTENNAE

[75] Inventors: Helmut Klausing, Bad Aibling; Horst Kaltschmidt, Neubiberg, both of Fed. Rep. of Germany

[73] Assignee: Messerschmitt-Bolkow-Blohm GmbH, Fed. Rep. of Germany

[21] Appl. No.: 534,284

[22] Filed: Jun. 7, 1990

[30] Foreign Application Priority Data

Jul. 5, 1989 [DE] Fed. Rep. of Germany ....... 3922086

[51] Int. Cl.⁵ ............................................. G01S 13/90
[52] U.S. Cl. ..................................................... 342/25
[58] Field of Search .................................. 342/25, 61

[56] References Cited

U.S. PATENT DOCUMENTS 4,638,315 1/1987 Raven ................................... 342/25
4,737,788 4/1988 Kennedy .............................. 342/29

FOREIGN PATENT DOCUMENTS 2835932 10/1983 Fed. Rep. of Germany .

OTHER PUBLICATIONS ntz Archiv Bd., 9 (1987) H. 1-Article, "Ein SAR-Konzept auf der Basis rotierender Antennen (Rosar)", pp. 15–23, no translation.

Primary Examiner—John B. Sotomayor
Attorney, Agent, or Firm—Evenson, Wands, Edwards, Lenahan & McKeown

[57] ABSTRACT

The present invention relates to a radar system having a synthetic aperture on the basis of rotating antennae. In order to achieve real-time capacity with a high discrimination despite the high data flow, reference functions are determined by a geometry module and a circuit for dividing the strip illuminated by the antennae into a specific number of range intervals. As a result of the division of the overall analysis circuit into individual modules, a complete analysis of the incoming signals can take place despite the high data flow. By signals from additional kinematics sensors integrated into the tips of the rotor carrying the antennae, the reference functions are corrected for rotor movements which deviate from the ideal orbit.

12 Claims, 8 Drawing Sheets

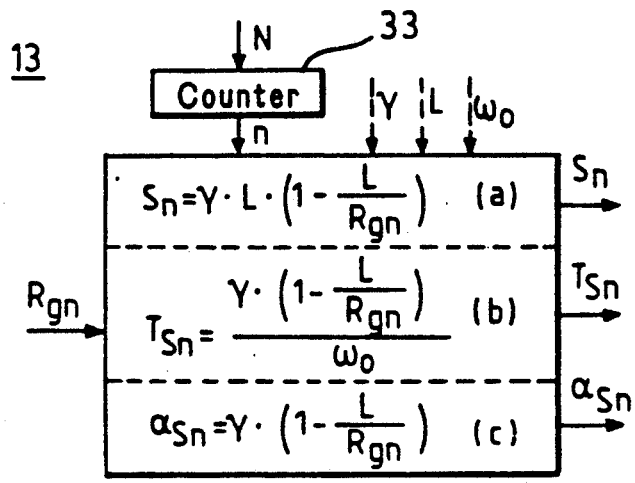
FIG. 8
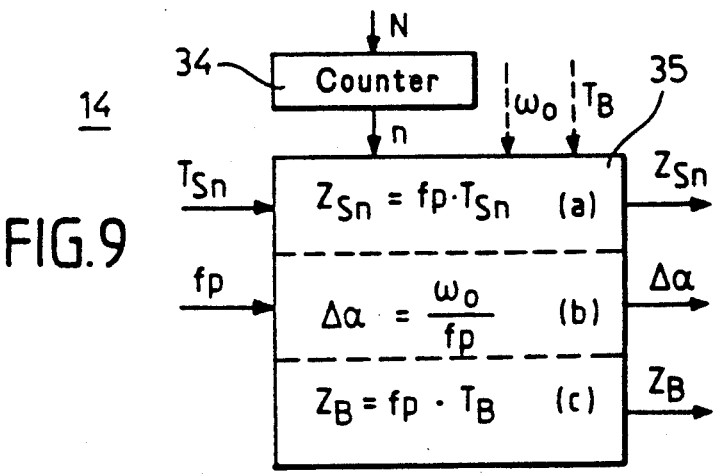
FIG. 9
FIG. 10
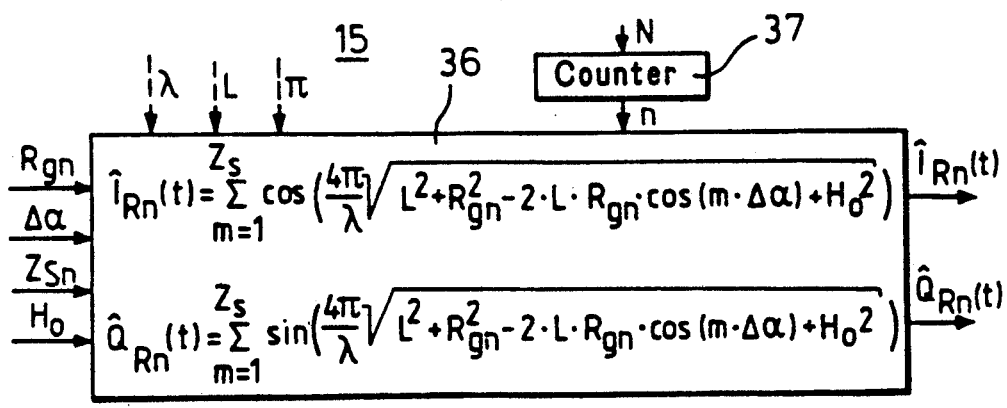

λ  L  Δα  $Z_s$
↓  ↓  ↓   ↓

51 — $R_{Go} \gg L$ und $R_{Go} \leq H_0$ :

$$\hat{I}_R(t) = \sum_{m=1}^{Z_s} \cos\left[\frac{4\pi}{\lambda} \cdot \cos\Theta \cdot (1 - \cos m \cdot \Delta\alpha)\right]$$

$$\hat{Q}_R(t) = \sum_{m=1}^{Z_s} \cos\left[\frac{4\pi}{\lambda} \cdot \cos\Theta \cdot (1 - \cos m \cdot \Delta\alpha)\right]$$

$H_0 \Rightarrow$

52 — $R_{Go} \gg L$ und $R_{Go} \gg H_0$ :

$$\hat{I}_R(t) = \sum_{m=1}^{Z_s} \cos\left\{\frac{4\pi}{\lambda} \cdot L \cdot [1 - \cos(m \cdot \Delta\alpha)]\right\}$$

$$\hat{Q}_R(t) = \sum_{m=1}^{Z_s} \sin\left\{\frac{4\pi}{\lambda} \cdot L \cdot [1 - \cos(m \cdot \Delta\alpha)]\right\}$$

permanently wired

53 — complete solution

FIG. 13

RADAR SYSTEM HAVING A SYNTHETIC APERTURE ON THE BASIS OF ROTATING ANTENNAE

BACKGROUND OF THE INVENTION

The present invention relates to a radar system having at least one transmitter and one receiver, the at least one antenna of which, for the transmitting and receiving of radar pulses, being arranged at the end of a rotating arm. The radar system has a device for the demodulating and intermediate storage of the reception signals, and devices for forming and storing reference functions as a function of the illumination geometry of the radar system of the range intervals to be measured, of the rotating-angle areas, of the transmitting pulses as well as of the height of the rotating antenna above ground. The system also has a correlator for correlating the reception signals with the reference functions, as well as a display device for displaying the correlation results.

A radar system of this type having a synthetic aperture on the basis of rotating antennae (ROSAR) is known from the journal *ntz-Archiv*, Volume 9, 1987, Issue 1, Pages 13–23. In that system, the antennae are arranged at the ends of a rotating supporting arm, for example, at the blade tips of helicopter rotors. The radar method using a synthetic aperture is based on the evaluation of Doppler information for each individual point on the ground inside the real antenna lobe and therefore requires a relative movement of the antenna and a pulsed coherent radar system. The relative movement of the antenna, in the case of a ROSAR-system, is generated by the rotating movement of the antennae with respect to a target to be detected. The reception signal is crosscorrelated pulse by pulse by means of a set of reference functions derived from the geometry of illumination, in which case a reference function exists for every distance element or every discrimination cell on the ground. This computer-intensive processing represents an adaptive filter which leads to a higher cross-discrimination than the cross-discrimination that would correspond to the real antenna lobe. In this manner, the discrimination by a synthetic aperture can be increased by one order in comparison to the discrimination by means of a real aperture.

When antennae are arranged at the blade tips of a helicopter rotor, the rotational speed at the tips at approximately 200 m/sec is significantly higher than the cruising speed of the helicopter above ground. The Doppler information, which is generated on the basis of the rotating speed of the tips, is therefore significantly higher than that generated on the basis of the translational movement of the helicopter so that this latter Doppler shift generally does not have to be taken into account. As a result of the antennae mounted in the rotor blade tips, an annulus is illuminated because of their oblique viewing direction downwards, the illuminated strip width being a function of the angle of beam in the elevation, the depression angle, i.e., the angle between the viewing direction of the antenna and the horizontal level, and the height of the antenna above ground. Echoes originating from the illuminated strip, because of their Doppler modulation, are compressed to a higher azimuth discrimination, in which case, for each range point on the ground, the Doppler time function is known as the pertaining reference function. This reference function can be calculated for every plotted point on the ground in a deterministic manner. The whole radar system therefore represents an adaptive filter in which a focussed processing is required.

If, by means of this type of a ROSAR-system, an acceptable discrimination is to be achieved within the range of one meter, a large number of correlation calculations must take place within a short period of time, i.e., an enormous data flow must be processed. A processor which might be able to process this data flow would have to have a special processor structure that is adapted to the ROSAR-principle and could not be provided in the addressed article.

From the German Patent document DE-PS 28 35 932, a ROSAR-system is known in which the antennae are arranged in the blade tips of a helicopter rotor. This system is used as a cartography radar system. In order to simplify the processor structure and to permit conventional signal processing, some limitations are, however, required in that system. Essentially only stationary targets and no moving targets are to be detected. As a result, the correlation calculations may be combined over several periods of rotor rotation. However, for this reason, this ROSAR-system cannot be called a real-time radar system and can therefore not be used, for example, for navigation, and definitely not for target tracking. In addition, in the case of this known concept, the flight altitude of the helicopter above ground is not taken into account because it is constantly assumed to be very large in comparison to the range to the targets. In addition, the described system does not account for the distortion of the illuminated areas by the rotating antennae, i.e., the curvature of the individual discrimination cells. This curvature is called a range curvature.

From U.S. Pat. No. 4,638,315, a radar system having a synthetic aperture is known in which the radar transmitter is fixed, for example, installed in the helicopter cabin, while the reception antenna rotates and is arranged, for example, at the rotor blade tip. The radar transmitter illuminates the area to be monitored while the reflected signals are received by the rotating antenna. The resulting Doppler shift is compensated by the generating of a pilot signal. By a mixing of frequencies, a range signal can then be received. In the true sense of the meaning, this radar system is not a ROSAR-system because no reference functions and no crosscorrelation are formed.

It is an object of the present invention to provide a processor structure, particularly for the formation of the reference functions, by which the discrimination of the ROSAR-system is increased and distortions of the calculated data are avoided as much as possible.

SUMMARY OF THE INVENTION

This and other objects ar achieved by the present invention which provides a radar system comprising at least one transmitter and at least one receiver, having at least one antenna for the transmitting and receiving of radar pulses. The antenna is arranged at the end of a rotating arm. The system includes means for the demodulating and intermediate storage of reception signals, means for forming reference functions as a function of the illumination geometry of the radar system of range intervals to be measured, of the rotating-angle areas, of the transmitting pulses as well as the height of the rotating antenna above ground. The system also has means for storing the reference functions, and means for correlating the reception signals with the reference functions. The correlation result is displayed by a means for displaying. The means for forming the reference functions includes: a geometry module in which, from an opening angle and a depression angle of the antenna, the length of the rotating arm, and the height of the antenna above ground, the width of a range strip having inner and outer illuminated strip edges illuminated by the antenna is determined, as well as the range difference between the beams from the antenna to the inner and outer illuminated strip edges. The means for forming the reference functions also includes a circuit for dividing the illuminated strip into a specific number of range intervals, and a module for forming the reference functions for the individual range intervals.

In the geometry module, the width of a range strip illuminated by the antenna and the range difference between the beams from the antenna to the front or to the rear illuminated strip edge is calculated from the opening angle and the depression angle of the antenna, the length of the rotating arm and the height of the antenna above ground. In a circuit, this illuminated strip is resolved into a specific number of range intervals or range cells. The reference functions are then calculated for these individual range cells. By means of a controlled crosscorrelation of the incoming signals with the reference functions of the assigned range cells, the actual result signal will then be obtained which will be stored and possibly displayed in a known manner.

The circuit for the subdividing of the illuminated strip into a certain number of range cells, in this case, preferably has a module for calculating the number of range cells within the illuminated strip, in which case this calculation takes place from the calculated range difference as well as the characteristics of the antenna and the desired range discrimination. From this number, the individual range intervals within the illuminated strip can then be calculated. In addition, a module is provided for the calculating of the integration time for the individual range intervals as well as a module for calculating the number of transmitting pulses and of the rotating angle area for the range intervals on the basis of the integration time. By means of this type of a circuit, it is ensured that in each case only signals from previously determined range intervals are crosscorrelated with one another.

By dividing the processor structure into individual modules, which are each designed for specific tasks, it is possible, despite the high data flow, to process the incoming signals in such a manner that a high discrimination is achieved by means of acceptable expenditures, which allows a picture to be produced.

When the antennae are arranged at the blade tips of a helicopter rotor, it is possible by means of a kinematics sensor, for example, with the aid of acceleration sensors, to determine the vertical deviations of the helicopter rotor and also the deviation from the constant angular velocity and to use these measured values for correcting the analysis. The corrections of the respective calculated reference functions required because of the vertical movement and the varying angular velocity become possible by adding several correction terms.

The ROSAR-system according to the invention may be used, for example, for aerial reconnaissance; for navigation, such as navigation of rescue transport helicopters; for cartography; for measuring the dimensions of sea waves; for searching open and hidden land mines, etc. The radar system may be arranged stationary or on vehicles. By means of the indicated development of the processor structure, it is particularly also possible to process radar signals from a very short range effectively and in quasi real time which is absolutely necessary for navigational operations.

Other objects advantages and novel features of the present invention will become apparent from the following detailed description of the invention when considered in conjunction with the accompanying drawings.

BRIEF DESCRIPTION OF THE DRAWINGS

FIG. 8 is a schematic representation of an embodiment of a module for calculating the integration time used in the embodiment of FIG. 4.

FIG. 9 is a schematic representation of an embodiment of the module for determining the support points for the calculation of the reference functions used in the embodiment of FIG. 4.

FIG. 10 is a schematic representation of an embodiment of the module for the calculation of the reference functions used in the embodiment of FIG. 4.

FIG. 13 is a schematic representation of an embodiment of a module for the reference functions when there are varying approximation conditions.

DETAILED DESCRIPTION OF THE DRAWINGS

The formulas indicated in the Figures are a direct component of this specification even if no explicit reference is made to the respective Figure. The purpose of this is to facilitate the reading of this specification.

Figure 1A:
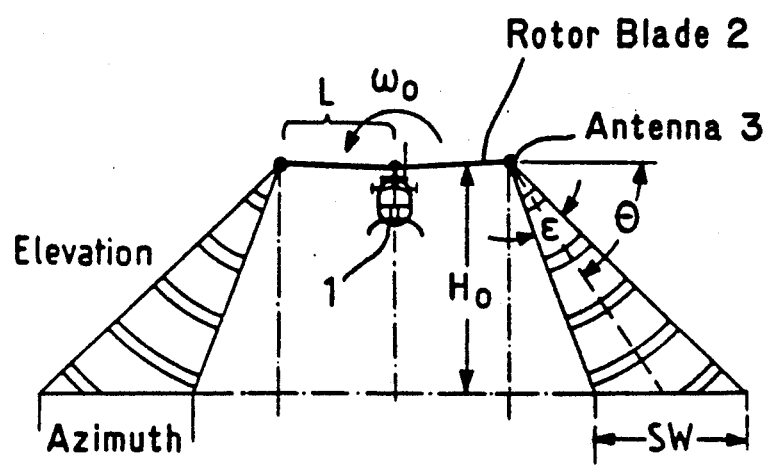
FIGS. 1a and 1b represent the illumination geometry, which is not true to scale, of a ROSAR-system, the antennae of which are arranged on the rotor blade tips of a helicopter.
Figure 1B:
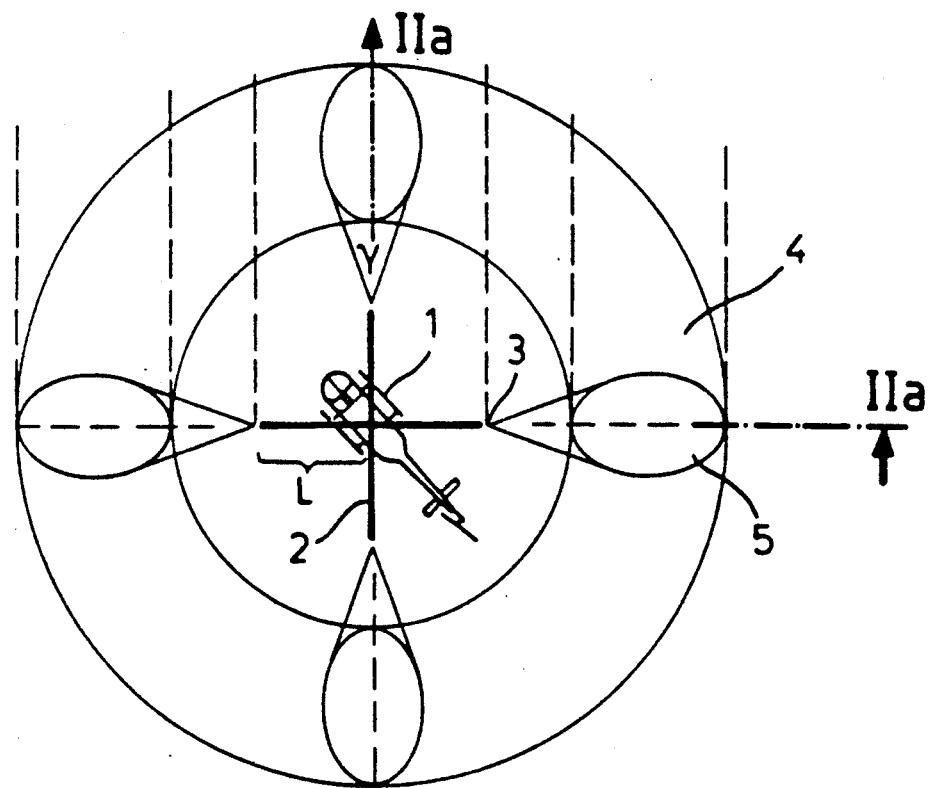

As seen in FIGS. 1a, 1b, a helicopter 1 has a four-bladed rotor 2, one antenna 3 being arranged on each of the blade tips of this rotor at a distance L from the rotor axis. The rotor rotates at an angular velocity of omega-zero ($\omega_0$). The opening angle of the individual antennae in the azimuth is gamma ($\gamma$); the opening angle of the antennae in the elevation is epsilon ($\epsilon$), and the depression angle of the antenna viewing direction with respect to the horizontal is theta ($\Theta$). When rotor 2 rotates, an annulus 4 with a strip width SW is therefore illuminated on the ground corresponding to FIG. 1b. The areas inside the annulus 4 which are momentarily illuminated by antenna 3 are represented by the light oval shapes 5.

Figure 2A:
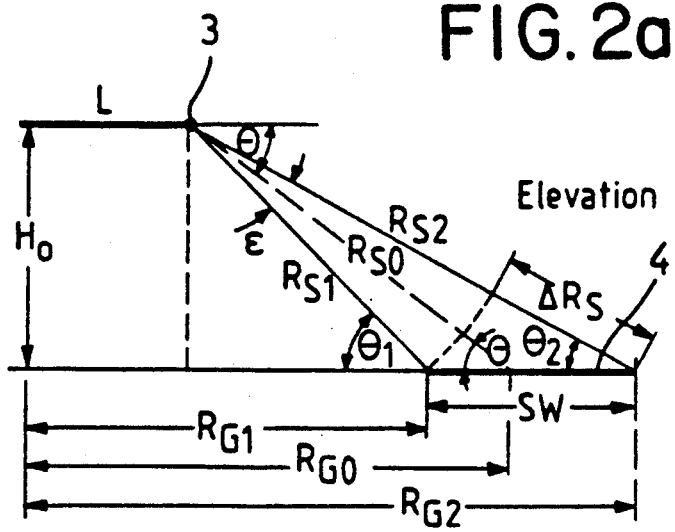
FIGS. 2a and 2b represent a cutout of the illumination geometry for explaining relevant parameters.
Figure 2B:
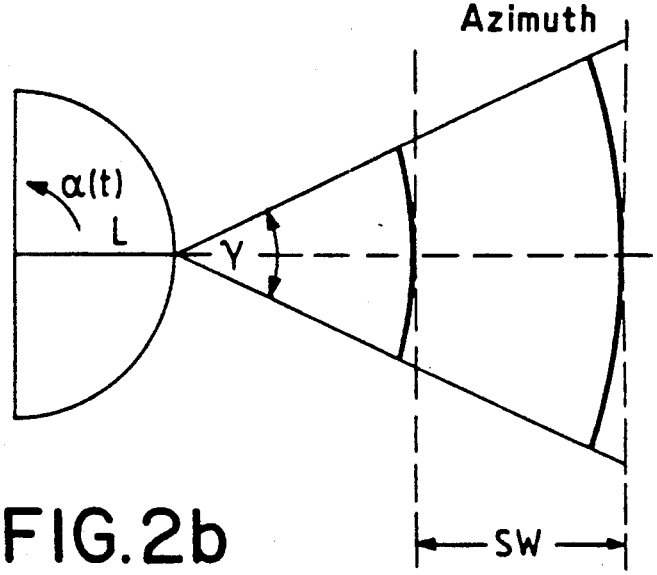

FIGS. 2a and 2b show this illumination geometry in the elevation and in the azimuth in more detail. The inner edge of the illuminated annulus 4 with the strip width SW, on the ground, is located at a range of $R_{G1}$ from the projected center of the helicopter, its range between the antenna 3, being $R_{S1}$. Theta$_1$ ($\Theta_1$) is the depression angle between the antenna and this plotted point. The quantities $R_{G2}$, $R_{S2}$, and Theta$_2$ ($\Theta_2$) apply to the corresponding plotted point at the outer edge of the illuminated annulus 4. $R_{G0}$ and $R_{S0}$ apply to the plotted point on the ground with a view to the central viewing direction of the antenna 3 with the depression angle theta ($\Theta$). The difference between $R_{S2}$ and $R_{S1}$ is marked with delta $R_S$ ($\Delta R_s$) in FIG. 2.

Figure 3:
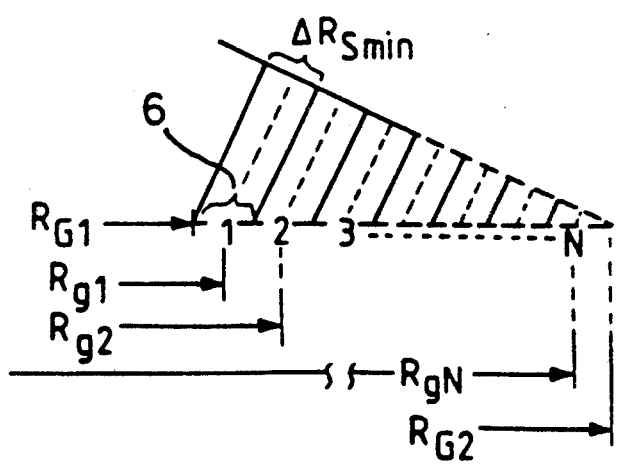
FIG. 3 represents a cutout of the illumination geometry for explaining the position of the range intervals within an illuminated strip.

According to FIG. 3, the strip width of the annulus between $R_{G1}$ and $R_{G2}$ is divided into individual range intervals 6 of the same radial size, the radial centers of these range intervals being located at ranges $R_{g1}$, $R_{g2}$ to $R_{gN}$. The overall number of these range intervals 6 is N. This number is a function of the minimal range discrimination delta $R_{Smin}$ ($\Delta R_{smin}$).

Figure 4:
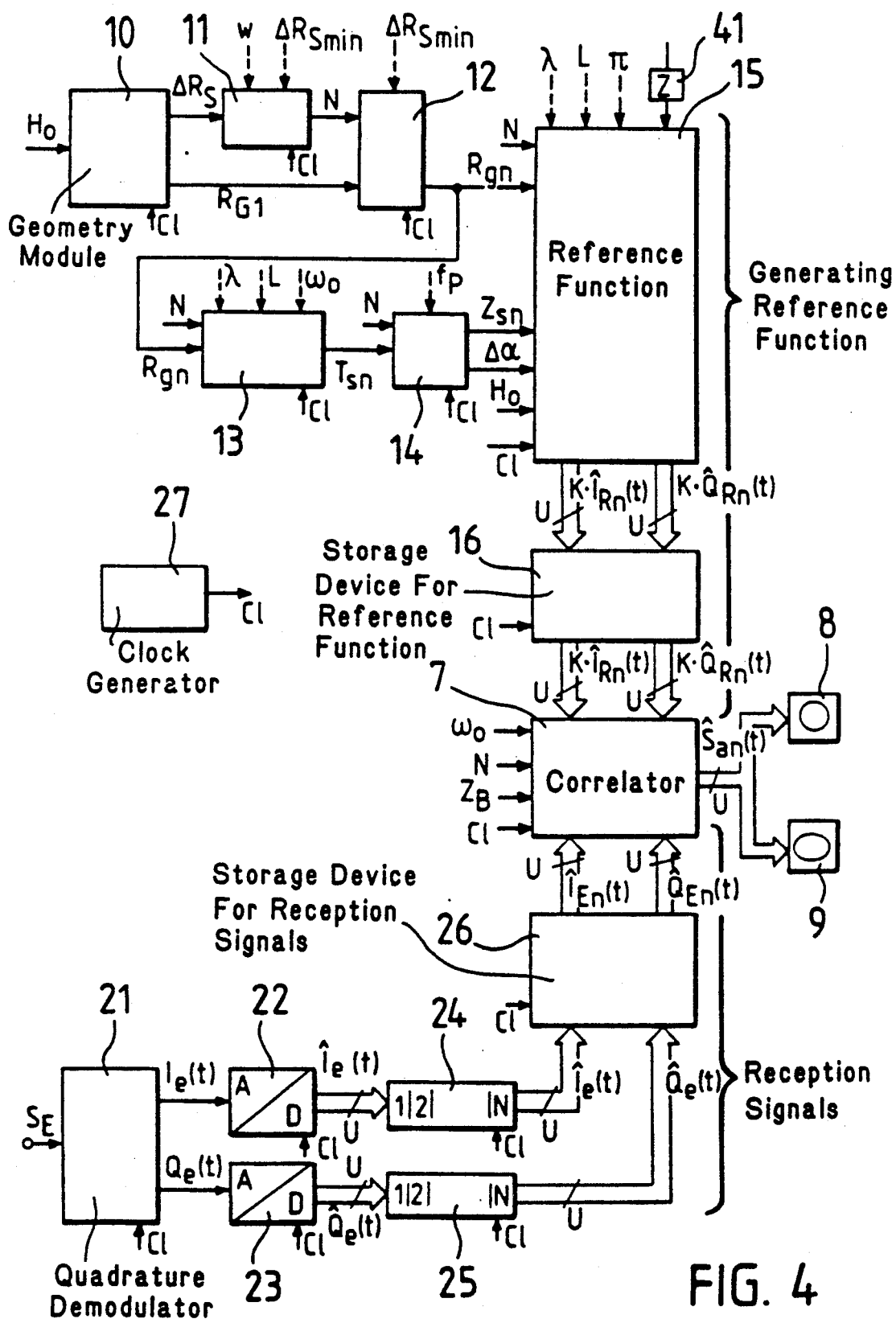
FIG. 4 is a block diagram of a ROSAR-processor constructed in accordance with an embodiment of the present invention.

FIG. 4 describes a block diagram of a processor for a ROSAR-system. The upper half of the block diagram shows those modules which are required for generating the reference functions, and the lower half shows those modules which are used for the reception of the signals reflected from the ground. The reference signals and the received signals are correlated in a correlator 7 and are provided to a storage device 8, such as a magnetic tape. An additional display on a monitor 9 is possible.

For the determination of the reference functions, a geometry module 10 is provided. Also provided is a module 11 for determining the number of range intervals, a module 12 for indicating the individual range intervals, a module 13 for indicating the integration time, a module 14 for indicating the support points for the reference functions, and a module 15 for the determination of the reference functions from the input data for the individual range intervals. These reference functions are supplied to a storage device 16 which furnishes the reference signals to the correlator 7.

The processing of the reception signals $S_E$ takes place in an essentially conventional manner. A stored reception signal, as the intermediate frequency signal, is supplied to a quadrature demodulator 21 and is processed by means of quadrature mixing and is separated into an in-phase component $I_e$ of the echo signal and a quadrature component $Q_e$ of the echo signal. These components $I_e$, $Q_e$ are supplied separately to analog-digital converters 22, 23, at the output of which there will then be discrete scanning values $\bar{I}_e$ and $\bar{Q}_e$ of the word length U. These complex echo signals are stored in intermediate storage devices 24, 25, which each have N storage spaces corresponding to the above-mentioned N range intervals. The scanning values of the intermediate storage devices 24, 25 are supplied to a storage device 26 for the reception signals which, in turn, on the output side, is connected with the second input of the correlator 7.

The method of operation of the whole processor is controlled by clock generator 27 which emits a clock pulse Cl to the modules for generating the reference function 10-16 as well as to the modules for processing the reception signals 21-26 and to the correlator 7.

Figure 5:
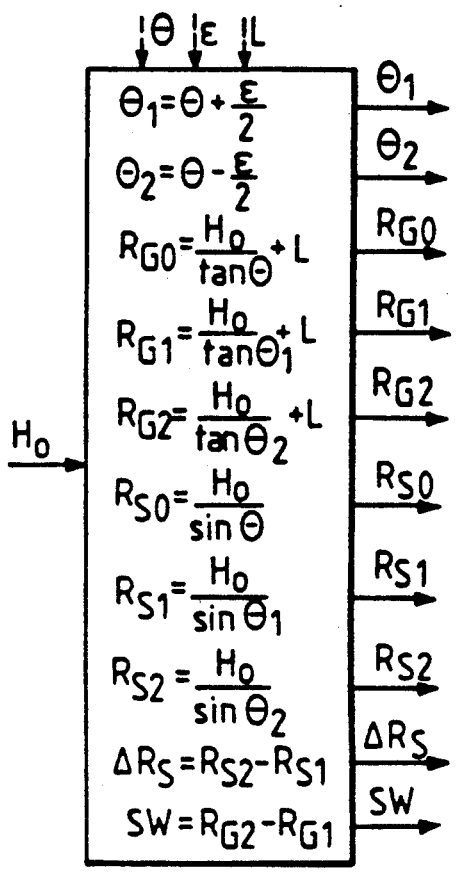
FIG. 5 is a schematic representation of an embodiment of a geometry module used in the embodiment of FIG. 4.
Figure 6:
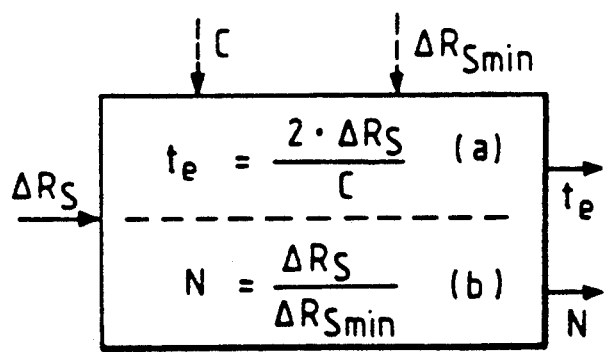
FIG. 6 is a schematic representation of an embodiment of the module for calculating the number of range intervals used in the embodiment of FIG. 4.

FIG. 5 shows the geometry module 10, specifically by means of the functional quantities to be calculated by it which it determines from input values and uses them to calculate corresponding output values. Input values are the height above ground $H_O$, the depression angle theta ($\Theta$), the opening angle epsilon ($\epsilon$) of the antenna in the elevation, and the distance of the antenna from the point of rotation, i.e., the length L of the rotor blade 2. On the basis of the geometric relationships shown in block 10, the output values are obtained which are shown in FIGS. 1 and 2, specifically theta$_1$ ($\Theta_1$), theta$_2$ ($\Theta_2$), $R_{G0}$, $R_{G1}$, $R_{G2}$, $R_{S0}$, $R_{S1}$, $R_{S2}$, SW and delta $R_S$ ($\Delta R_s$). From the output value delta $R_S$ ($\Delta R_s$), by means of the indicated formulas, the echo duration $t_e$ and the number N of range intervals within the illuminated strip are calculated in module 11 (FIG. 6). For calculating the echo duration $t_e$, the velocity of light C must also be indicated as an input value. The number N corresponds to the number of discrimination cells corresponding to the individual range intervals $R_{g1}$ to $R_{gN}$ in the radial direction on the ground corresponding to FIG. 3.

Figure 7:
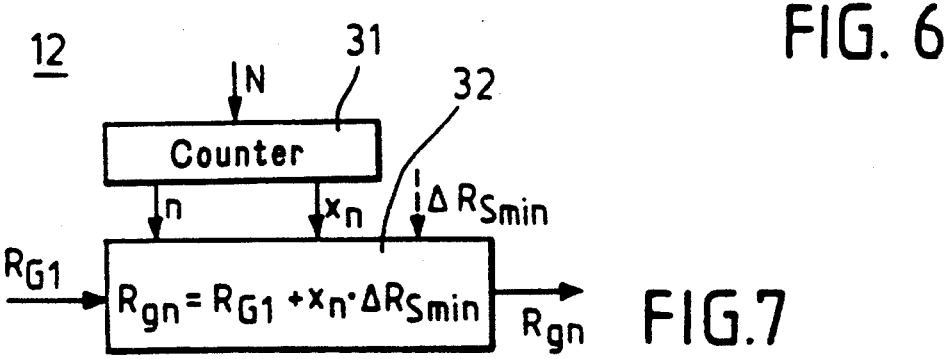
FIG. 7 is a schematic representation of an embodiment of a module for calculating the individual range intervals used in the embodiment of FIG. 4.

From the input value $R_{G1}$, which is supplied by geometry module 10, and the number N from module 11, module 12 computes the actual values for the individual range intervals $R_{gn}$, as shown in FIG. 7. The number N of the range intervals is supplied to a counter 31, which, from the input value n to N, in each case, computes an output value $x_n$ which is reduced by the value $\frac{1}{2}$ with respect to the input value. The output signals of the counter 31, together with the delta $R_{Smin}$ ($\Delta R_{smin}$) signal for the range discrimination and the $R_{G1}$ signal, are supplied to a function block 32 in which, corresponding to the indicated formula, the $R_{gn}$ values are computed for the individual range intervals.

These $R_{gn}$ values are supplied to module 13 (FIG. 8). This module, via a counter 33, also receives the respective assigned number n of the total of N rang intervals and from these values and the opening angle gamma ($\gamma$) of the antenna 3 in the azimuth, the length L of the rotor blade 2 and the angular velocity omega-zero ($\omega_0$) of the rotor blade, according to the formulas indicated in FIG. 8, calculates the synthetic aperture $S_n$, the integration time $T_{Sn}$ and the rotating angle area $\alpha_{sn}$ of the integration, in each case, for one of the range intervals, which is indicated by index n. This index runs from 1 to N.

In module 14 (FIG. 9), on the basis of the integration time $T_{Sn}$ for each range interval and the pulse repetition frequency $f_p$ of the radar system, the number $Z_{Sn}$ of support points for the reference function during the integration is calculated as well as the step size delta alpha ($\Delta \alpha$) of the support values for the Doppler scanning and the reference function as well as the total number $Z_B$ of the support points for a full rotation of an antenna. Other input values are the total number N of the range intervals which are supplied to a counter 34 in a timed manner which ensures the calculation of the output values for each range interval n. Other input values are the angular velocity omega-zero ($\omega_0$) of the rotor and the imaging duration $T_B$. This imaging duration is the whole time duration $T_B$ during which an illumination of the environment takes place. Its maximum value, for one rotation of the rotor, is determined by the circumference of the rotor blade plane and the rotational speed.

The number of support points, which is a function of the pulse repetition frequency and the integration time, determines the capacity of the storage device 16 for the reference functions. The storage device 16 is designed for the maximally occurring number of support points; i.e., for a number which exists along the outer strip edge of the illuminated annulus. The step size delta alpha ($\Delta \alpha$) of the support values corresponding to a respective angle area for the integration is assigned directly to this number of support points.

From the values $R_{gn}$, delta alpha ($\Delta\alpha$), $Z_{Sn}$ and the antenna height $H_0$ above ground, the reference functions $S_R$ may then be calculated in module 15 corresponding to FIG. 10 on the basis of the formulas indicated there. The wave length lambda ($\lambda$), the rotor blade length L and pi ($\pi$) are indicated for this calculation. The calculation takes place in a function block 36 to which, by way of a counter 37, the number n of the respective range interval is also supplied.

The reference function $S_R$ comprises a real part $I_R$ and an imaginary part $Q_R$. This applies to every range interval 1 to N, which is expressed by the additional index n. The formulas, on which this calculation is based, are indicated in function block 36 corresponding to FIG. 10 as scanning values which are marked by a carat ($\hat{\ }$). The calculation of the reference functions takes place for all range intervals so that the scanning values are each summed up by means of the number $Z_S$ of the transmitting pulses.

Figure 11A:
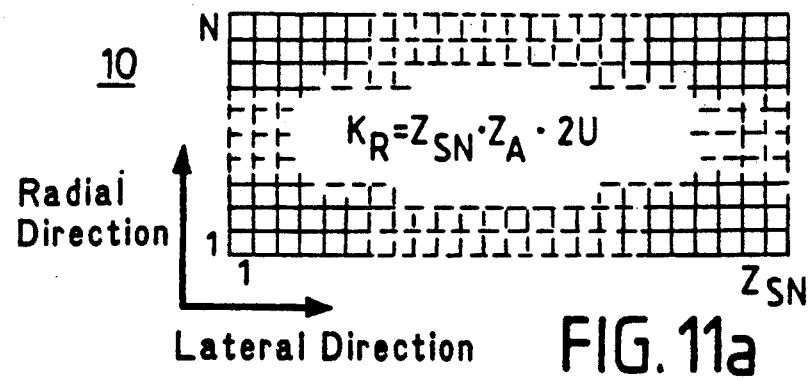
FIGS. 11a and 11b respectively show a storage device for the reference functions and the scanned reception signals.

The reference functions determined for all range intervals are supplied to the storage device 16, the structure of which is schematically shown in FIG. 11a. This storage device 16 is divided into lines and columns, a reference function for one range interval being stored in each line. The number of lines is determined by the number N of the range intervals; the number of columns is determined by the number $Z_{SN}$ of support points by way of the aperture length taken into account. The number of support points is determined by the desired overall viewing angle of the radar system which may, for example, be 180° if a detection of targets is desired only in the forward direction relative to the flight direction of the helicopter. The capacity $K_R$ is determined by the product of the total number $Z_{SN}$ of support points, by the number $Z_A$ of scanning values in the radial direction and twice the value of the word length U of the digitally converted signals because these are present as complex values.

Figure 11B:
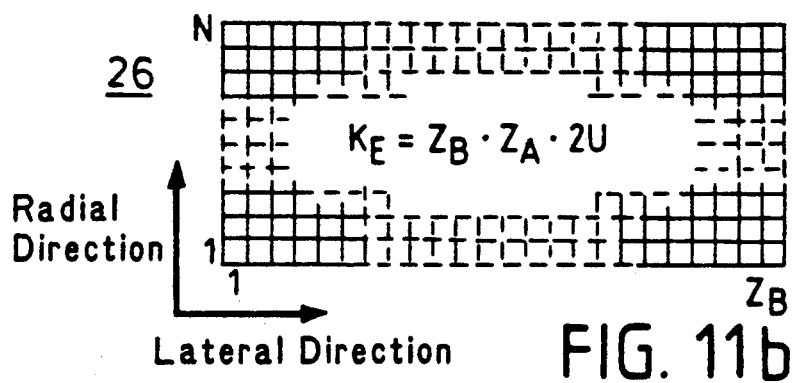

In a similar manner, the scanning values of the received signals are stored in the storage device 26 according to FIG. 11b. The storage capacity $K_E$ of this storage device 26 is determined by the product of the number $Z_B$ of the transmitting pulses in the lateral direction; the number $Z_A$ of the scanning values in the radial direction; and again of twice the word length U of the digitally converted reception signals.

Figure 12:
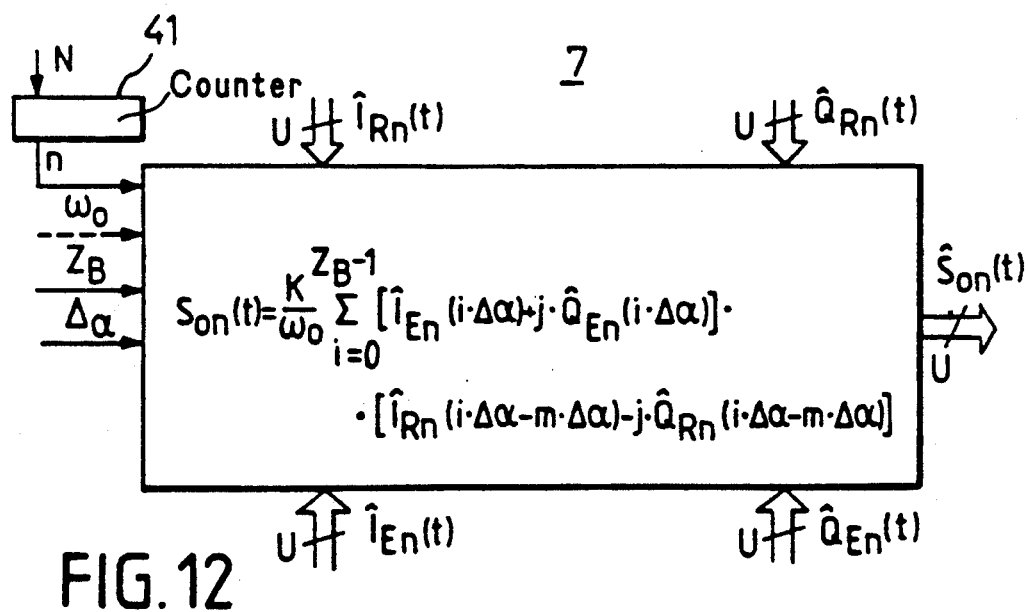
FIG. 12 is a basic diagram of an embodiment of a correlator.
Figure 14:
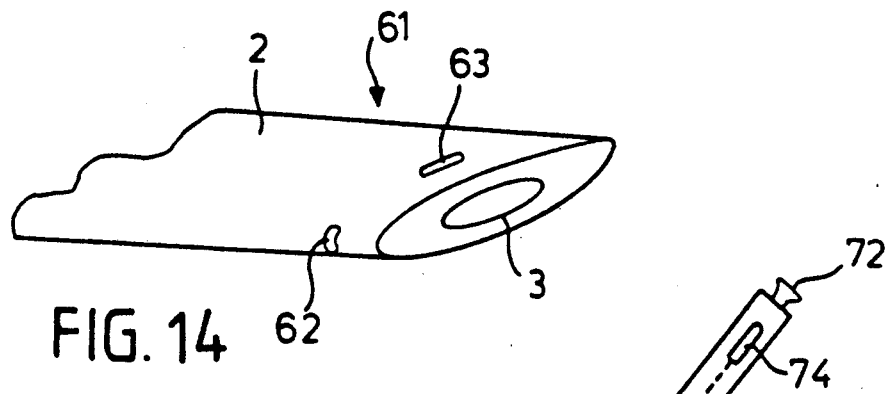
FIG. 14 is a schematic view of the blade tip of a helicopter rotor having an antenna and a kinematics sensor for taking into account the vertical movement of the rotor and the non-constant rotor frequency.

In the correlator 7 (FIG. 12), in a manner timed for each considered range interval, the real and imaginary values of the reception signals supplied by the storage device 26 are compared with the corresponding values of the reference functions and are complexly crosscorrelated. In the correlator 7, the respective number of the viewed range interval is supplied as a default by way of a counter 41. Also supplied as default values are the angular velocity omega-zero ($\omega_0$) of the rotor blade, the number $Z_B$ of the transmitting pulses in the lateral direction corresponding to the number of support values, and the respective step size delta alpha ($\Delta\alpha$) of the support values for the Doppler scanning and the reference function. The correlation results for the individual scannings are furnished as result signals $\hat{S}_{on}(t)$ to the storage device 8 or the monitor 9.

By means of the described processor structure, the correlation is calculated in real time for all values of the input parameters. When the length L of the rotor blade is very small in comparison to the range $R_{G1}$ on the ground between the rotating point of the antenna and the inner edge of the illuminated strip, the function calculations inside the geometry module 10 may be simplified. This will then result in a simpler calculation of the reference function which is derived directly from the indicated formulas. Therefore, for the calculation of the reference function and of the correlation, a first approximation may take place by means of a simpler circuit which is represented by block 51 in FIG. 13. If, in addition, $R_{G0}$ becomes very large in comparison to L and, at the same time, in comparison to the height $H_0$ of the antenna above ground, the indicated formulas may be further simplified. The circuits for the generating of the reference function, in this case, may be permanently wired and are shown in FIG. 13 in function block 52. The above-indicated complete solution must be used only for the remaining cases; i.e., essentially for the detection of targets in the very short range. When the ROSAR-system is used on a helicopter, for example, for navigational support, the majority of all navigational tasks can be carried out using the approximation solutions, i.e., essentially by means of permanently wired circuits.

As indicated by the formulas for the reference functions, these are dependent on the angular velocity of the rotor blade and also the height above ground. The degrees of freedom of the rotor blade seats during the circular movement are radial deviations from the orbit, height deviations and twisting around the rotor axis. A non-constant angular velocity may also be present. The twisting around the axis and the radial deviation essentially do not have to be taken into account if the rotor blade is well balanced. Thus, essentially only the vertical deviation of the rotor blade and the deviation from the constant angular velocity remain for the correction of the reference functions. In order to detect these two values, one kinematics sensor comprising two acceleration sensors 62 and 63 is arranged at each of the blade tips, acceleration sensor 62 determining the vertical movement and acceleration sensor 63 determining deviations from the constant angular velocity. The time-related fluctuations of the height of the antenna 3 above ground may be determined by a double integration of the signals detected by acceleration sensor 62, whereas the deviations of the circular frequency are detected by a single integration of the signals of the acceleration sensor 63 divided by the rotor blade length. These time-dependent corrections are used in the equation for the reference function instead of constant values $H_0$ and omega-zero ($\omega_0$) of that formula.

Figure 15:
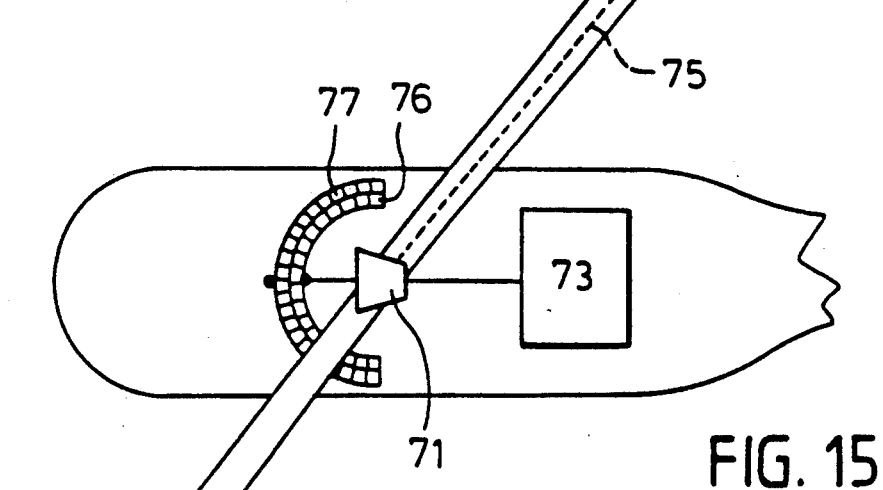
FIG. 15 is a schematic representation of a helicopter having a modified ROSAR-system constructed according to the present invention.

In the above description, it was assumed that the transmitter antennae as well as the reception antennae are arranged at the blade tips of the rotor. Although it is definitely possible to transmit the energy required for actuating the transmitter antenna from the helicopter cabin to the antennae by way of rotary coupling, it is also possible, as shown in FIG. 15, to mount the transmitter antenna 71 stationarily, for example, on the rotor masts of the helicopter and to integrate only the reception antenna 72 into the tip of the rotor 2. Since now the Doppler information is generated only by way of the rotating reception antennae and not in addition by way of the transmitter antenna, the above-indicated formulas may be divided by the factor 2 while the parameters with respect to the Doppler information otherwise remain the same.

Figure 16:
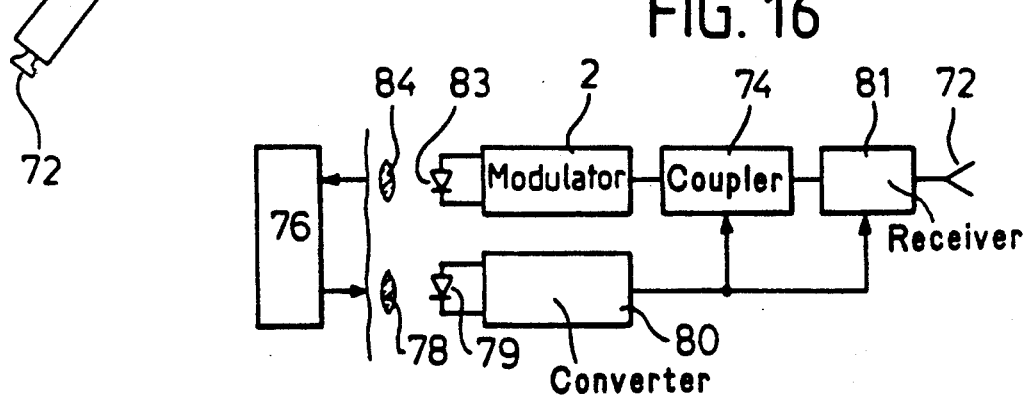
FIG. 16 is a block diagram for the wireless energy transmission between a helicopter and the rotors.

The energy transmission between the reception antenna 72 and the analysis circuit 73 of the ROSAR-system takes place in a wireless manner and preferably optoelectronically. For this purpose, the reception antenna is connected with an optoelectronic coupler 74 and converts the electrical signals of the antenna 3 to optical signals which transmit inside the rotor blade by way of optical fibers 75 and, in the area of the axis of rotation of the rotor blade, cooperate with a photodetector arrangement 76. An arrangement 77 of optoelectronic couplers is assigned to the photodetector arrangement 76 and converts the light signals into electrical signals and guides them to the analysis circuit 73. The energy transmission between the hull and the antenna 3, for example, for supplying the electrooptical coupler 74, can also take place wirelessly, for example, by means of a circular-slot line not shown here or by a laser arrangement. When using a laser arrangement, the arrangement 76 also comprises active laser transmitter diodes, the light of which is coupled into the optical fibers 75 and, in the area of the blade tip, is reconverted to electric energy for the optoelectronic coupler 74. This is schematically shown in FIG. 16. The laser beams emitted by the laser diodes of arrangement 76, via a lens arrangement 78 in the area of the axis of rotation of the rotor, are transmitted to the blade, are received there by a laser diode 79 and, in an optoelectronic converter 80 are reconverted to electric energy which is supplied to a receiver 81 of the transmitting antenna 72 and to the optoelectronic coupler 74. The reception signals of the antenna 72 are supplied to the receiver 81, are then converted optoelectronically in the coupler 74 and are modulated in a modulator 82. These modulated signals are beamed by means of a diode 83, are focussed by way of a lens arrangement 84 and are guided to the reception diodes of the photodetector arrangement 76.

The transmitter antenna arranged at the helicopter hull and the reception antenna have essentially the same antenna diagrams and have, for example, a horizontal opening angle of 180°. By means of these characteristics of the transmitter antenna, only the area located in front of the helicopter can be imaged. During the imaging period, the signals of the kinematics sensor 61 are guided to the analysis unit 73 and are used for correcting the reference functions. Likewise, the reception signal is converted to an intermediate frequency coherent with the beamed transmitting frequency and, by means of the light modulator and the laser transmitting diode by way of the laser transmission path, is transmitted to the photodetector unit 76. Thus the overall signal received by the reception antenna 72 as well as the correction signals for the reference functions for half a rotation of the rotor blade can be fed to the analysis unit 73.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A radar system comprising at least one transmitter and at least one receiver, having at least one antenna for the transmitting and receiving of radar pulses, said antenna being arranged at the end of a rotating arm;
    means for demodulating and intermediate storage of reception signals;
    means for forming reference functions as a function of illumination geometry of said radar system of range intervals to be measured, of rotating-angle areas, of transmitting pulses as well as the height of said antenna above ground;
    means for storing said reference functions;
    means for correlating said reception signals with said reference functions; and
    means for displaying a correlation result;
    wherein the means for forming said reference functions includes:
    a geometry module, in which, from an opening angle and a depression angle of said antenna, the length of said rotating arm, and the height of said antenna above ground, the width is determined of a range strip illuminated by said antenna having inner and outer illuminated strip edges, as well as the range difference between the beams from said antenna to said inner and outer illuminated strip edges;
    a circuit for dividing said illuminated strip into a specific number of range intervals; and
    a module for forming said reference functions for said individual range intervals.

2. A radar system according to claim 1, wherein said circuit for the dividing of the illuminated strip includes:
    a module for calculating said number of the range intervals within the illuminated strip by the division of a calculated range difference between the beams from said antenna to said inner and outer strip edges and a desired range discrimination;
    a module for calculating distances to the interval center within the illuminated strip on the basis of said number of range intervals;
    a module for calculating integration time for said individual range intervals; and
    a module for calculating the number of transmitting pulses corresponding to the number of support points for said reference functions and of the rotating angle area for the distances to the interval center on the basis of the integration time.

3. A radar system according to claim 2, wherein said module for calculating said number of range intervals calculates the echo duration to $2\,\Delta R_s/C$, C being the velocity of light, and $\Delta R_s$ being the calculated range difference.

4. A radar system according to claim 2, wherein said module for calculating distances to the interval center ($R_{gn}$) includes:
    a counter to which the respective number (N) of range intervals is supplied; and
    a function block which, from the output signals (N to $x_s$) of the counter, the distance ($R_{G1}$) on the ground to said inner edge of the illuminated strip and the desired range discrimination (delta $R_{Smin}$), computes the distances ($R_{gn}$) to the respective interval center with $$R_{gn} = R_{G1} + x_n \cdot \text{delta } R_{Smin}.$$

5. A radar system according to claim 2, wherein said module for calculating integration time ($T_{Sn}$) includes: a counter to which the number (N) of range intervals are supplied and which emits the number (n) of the respective range interval ($R_{gn}$), and wherein said module, from this number (n) and the respective range interval ($R_{gn}$), from the opening angle (gamma) of said antenna, the length (L) of the supporting arm and the angular velocity (omega-zero) of said antenna, in addition to the integration time ($T_{Sn}$), calculates the synthetic aperture (Sn) and the rotating angle area (alpha$_{Sn}$) of said antenna for each range interval ($R_{gn}$) as follows:

$S_n$ = gamma·L·(1 − L/$R_{gn}$)     (a)

$$T_{Sn} = \frac{\text{gamma} \cdot (1 - L/R_{gn})}{\text{omega} - \text{zero}}$$     (b)

alpha$_{Sn}$ = gamma·(1 − L/$R_{gn}$)     (c)

6. A radar system according to claim 2, wherein said module for calculating the number ($Z_{Sn}$) of transmitting pulses and of the rotating angle area (delta alpha) has a counter to which the number (N) of range areas ($R_{gn}$) are supplied and which emits the number (n) of the respective range interval ($R_{gn}$), and wherein this module for calculating the number, from this number (n), the integration time ($T_{Sn}$) and the pulse repetition frequency ($f_p$), and the angular velocity (omega-zero) of said antenna, calculates the number of support points ($Z_{Sn}$) and the angular step size (delta alpha) as follows:

$Z_{Sn} = f_p \cdot T_{Sn}$     (a)

delta alpha = omega−zero/$f_p$     (b)

7. A radar system according to claim 2, wherein said module for forming the reference functions ($S_R$) includes a counter to which the number (N) of the range interval ($R_{gn}$) is supplied and which emits the number (n) of the respective range interval ($R_{gn}$), wherein this module, from this number (n), the respective range interval ($R_{gn}$), the angular step size (delta alpha), the respective support point ($Z_{Sn}$) and the height ($H_0$) above ground, and the wave length (lambda) and the length (L) of the rotating arm, calculates the real part ($I_{Rn}$) and the imaginary part ($Q_{Rn}$) of the reference functions ($S_R$) as follows:

$$\hat{I}_{Rn}(t) = \sum_{m=1}^{Z_s} \cos(4\,\text{Pi}/\text{Lambda})\sqrt{L^2 + R_{gn}^2 - 2.L.R_{gn} \cdot \cos(m.\text{Delta Alpha}) + H_0^2}$$

$$Q_{Rn}(t) = \sum_{m=1}^{Z_s} \sin(4\,\text{Pi}/\text{Lambda})\sqrt{L^2 + R_{gn}^2 - 2.L.R_{gn} \cdot \cos(m.\text{Delta Alpha}) + H_0^2}$$

8. A radar system according to claim 1, wherein said rotating arm for said antenna has a kinematics sensor for determining vertical deviations of said rotating arm in the area of said antenna and deviations of the angular velocity of said rotating arm, said kinematics sensor providing height and angular velocity as variables to the measured accelerations in the reference functions.

9. A radar system according to claim 8, wherein said kinematics sensor has first and second acceleration sensors which are sensitive with respect to one another in vertical directions, said first acceleration sensor being aligned in a direction suitable for determining vertical movement of said rotating arm, and said second acceleration sensor being aligned in the rotating plane of said rotating arm.

10. A radar system according to claim 1, wherein the at least one antenna includes a reception antenna arranged on said rotating arm and is a rotating antenna, and a transmitter antenna arranged stationary with respect to the axis of rotation of said rotating arm on a rotor mast.

11. A radar system according to claim 10, wherein energy transmission to said rotating antenna and signal transmission from said rotating antenna via the axis of rotation of said rotating arm takes place wirelessly.

12. A radar system according to claim 11, wherein the energy transmission to said rotating antenna and the signal transmission from this antenna is performed by an optoelectronic coupler arrangement.

* * * * *